US012748195B2

(12) United States Patent
Lei

(10) Patent No.: US 12,748,195 B2
(45) Date of Patent: Sep. 29, 2026

(54) DETECTION APPARATUS AND METHOD

(71) Applicant: NINGBO ABAX SENSING CO., LTD., Ningbo City (CN)

(72) Inventor: Shuyu Lei, Ningbo City (CN)

(73) Assignee: Ningbo ABAX Sensing Electronic Technology Co., Ltd., Ningbo City (CN)

( * ) Notice: Subject to any disclaimer, the term of this patent is extended or adjusted under 35 U.S.C. 154(b) by 924 days.

(21) Appl. No.: 18/006,195

(22) PCT Filed: Jul. 26, 2021

(86) PCT No.: PCT/CN2021/108317
§ 371 (c)(1),
(2) Date: Jan. 20, 2023

(87) PCT Pub. No.: WO2022/022432
PCT Pub. Date: Feb. 3, 2022

(65) Prior Publication Data

US 2023/0258783 A1 Aug. 17, 2023

(30) Foreign Application Priority Data

Jul. 31, 2020 (CN) ......................... 202010761024.4
Jul. 31, 2020 (CN) ......................... 202010761262.5

(51) Int. Cl.
*G01S 7/4863* (2020.01)
*G01S 7/4865* (2020.01)
*G01S 17/14* (2020.01)

(52) U.S. Cl.
CPC .......... *G01S 7/4863* (2013.01); *G01S 7/4865* (2013.01); *G01S 17/14* (2020.01)

(58) Field of Classification Search
CPC ....... G01S 7/4863; G01S 7/4865; G01S 17/18
See application file for complete search history.

(56) References Cited

U.S. PATENT DOCUMENTS

2018/0209846 A1* 7/2018 Mandai .................. G01S 17/08
2019/0132537 A1* 5/2019 Webster .................. G01S 17/10
2022/0326358 A1* 10/2022 Paesen .................. G01S 17/89

FOREIGN PATENT DOCUMENTS

CN 110235024 A 9/2019
CN 110312945 A 10/2019
(Continued)

OTHER PUBLICATIONS

International Search Report, Sep. 18, 2021, China National Intellectual Property Administration, Application Number, Application No. PCT/CN2021/108317, mailed Oct. 15, 2021, 5 pages.

*Primary Examiner* — Yuqing Xiao
*Assistant Examiner* — Chia-Ling Chen
(74) *Attorney, Agent, or Firm* — Ziegler IP Law Group, LLC.

(57) ABSTRACT

Provided are a detection apparatus and a detection method. The detection apparatus comprises: a pulse light source, which is configured to emit a pulse light signal; a detector array, which includes a plurality of pixel units, wherein at least some of the plurality of pixel units are operating units, and the operating units obtain excitation information in response to background light and/or signal light photons incident thereon during a plurality of windows; and a processing module, which acquires time range information according to the excitation information of the operating unit.

18 Claims, 7 Drawing Sheets

(56) References Cited

FOREIGN PATENT DOCUMENTS

| | | | |
|---|---|---|---|
| CN | 110596722 | B | 10/2022 |
| WO | 2020150574 | A1 | 7/2020 |

* cited by examiner

DETECTION APPARATUS AND METHOD

The present application is the national phase of PCT International Application No. PCT/CN2021/108317, which claims priorities to Chinese Patent Applications No. Chinese Patent Applications No. 202010761024.4 titled "DETECTION APPARATUS AND METHOD", and No. 202010761262.5 titled "DETECTION APPARATUS AND METHOD", filed on Jul. 31, 2020 with the Chinese Patent Office, all of which are incorporated herein by reference in their entireties.

FIELD

The present disclosure relates to the technical field of detection, and in particular to a detection device and a detection method.

BACKGROUND

The principle of the Time of flight (TOF) method is described as follows. A light pulse is continuously emitted to a target, a light returned from the target is received by a sensor, and the distance to the target is obtained by detecting the flight (round-trip) time of the light pulse.

The Direct Time of Flight (DTOF) technology is a kind of the TOE In the DTOF technology, the distance to the target is directly acquired by calculating the emission time and the reception time of the light pulse, having the advantages of simple principle, high signal-to-noise ratio, high sensitivity and accuracy, and thus has attracted more and more attention.

Similarly, a high-precision and high-sensitivity distance detection solution can be achieved with the Indirect Time of flight (ITOF) technology. In the Direct time of flight detection, a time duration between an emitted radiation and a detected radiation after reflection from an object or other target is directly measured. In this way, the distance to the target can be determined.

In some applications, a photodetector array (for example, a single photon avalanche diode (SPAD) array) including a single photon detector is used to perform sensing on the reflected radiation. One or more photodetectors may define a detector pixel size of the array. The SPAD array can be used as a solid-state photodetector in imaging applications requiring high sensitivity and timing resolution. The SPAD is based on a semiconductor junction (e.g., a p-n junction). When being biased outside of the breakdown region thereof, for example, through or in response to a selective signal with a desired pulse width, the semiconductor junction may detect incident photons. A high reverse bias voltage may generate an electric field of sufficient magnitude, so that a single charge carrier introduced into a depletion layer of the device can cause a self-sustaining avalanche by collisional ionization. The avalanche can be quenched actively (e.g., by reducing the bias voltage) or passively (e.g., by using the voltage drop across a series resistor) by a quenching circuit to "reset" the device for further photon detection. The initial charge carrier may generate a photoelectric effect by a single incident photon striking a region of a high electric field. Due to this, the "single photon avalanche diode" is named. This operation mode of single photon detection is commonly referred to as the "Geiger mode".

In order to count the photons incident on the SPAD array, a digital counter or an analog counter may be used to indicate a detection time and an arrival time of a photon, which are referred as time stamps. Compared with the analog counter, the digital counter is easier to be implemented and extended, but is more expensive in terms of area (e.g., relative to the physical size of the array). The analog counter is more compact, but may be limited by photon counting depth (bit depth), noise and/or uniformity.

In order to add a time stamp for the incident photon, a time digital converter (TDC) is used in some ToF pixel methods based on SPAD arrays. The TDC may be used in time-of-flight imaging applications to improve the timing resolution of a single clock cycle. This digital solution has the following advantages. The size of the TDC can be extended with the technology node, and the stored values can be more robust with respect to leakage.

The TDC circuit may only perform process for one event measurement cycle in a single event, such that a row of SPADs requires multiple TDCs. the TDCs are more power consuming, which results in a larger array being more difficult to be implemented. Further, the TDC may generate relatively large amounts of data, for example, one 16-bit timestamp is generated per photon. A single SPAD connected to a TDC may generate millions of such timestamps per second. Thus, the imaging array having larger than 100,000 pixels may have an unfeasibly large data rate relative to the available input/output bandwidth or capability. However, the accuracy of the measurement cannot be achieved without using the TDC at all.

SUMMARY

In view of the above, a detection device and a detection method are provided in the present disclosure, to solve the technical problem of large data rate and the lack of accuracy of the detection device.

Solutions in embodiments of the present disclosure are provided.

In a first aspect, a detection device is provided in the present disclosure. The detection device includes a pulse light source, a detector array and a processing module. The pulse light source is configured to emit a pulse light signal. The detector array includes multiple pixel units, where at least some of the pixel units are used as operating units configured to acquire excitation information in response to background light and/or signal light photons incident thereon in multiple windows. The processing module is configured to acquire time range information based on the excitation information of the operating units.

In an embodiment, the operating units being the at least some of the pixel units in the detector array are further configured to acquire excitation information in response to background light and/or signal light photons incident thereon in multiple windows related to the time range information acquired by the processing module. The processing module is further configured to acquire final target detection information based on the excitation information in the multiple windows related to the time range information.

In an embodiment, a time width of each of the multiple windows is greater than a time width of each of the multiple windows related to the time range information.

In an embodiment, the detection device further includes a TDC module. The TDC module is configured to output a time code of the excitation information in the multiple windows related to the time range information to the processing module.

In an embodiment, the processing module is further configured to construct a histogram based on the time code.

In an embodiment, a flight time of the pulse light beam is determined based on the time range information and/or the histogram.

In an embodiment, the pulse light source is configured to emit N pulses, and the operating pixel units in the detector array are configured to acquire statistical information excited by background light and/or signal light photons in the N pulses.

In an embodiment, the detector array is provided by an SPAD array.

In an embodiment, time widths of the multiple windows are the same as each other.

In an embodiment, time widths of the multiple windows are related to the background light.

In an embodiment, the time widths of the multiple windows are set in accordance with a probability threshold of the background light triggering the operating pixel units in the detector array.

In an embodiment, the time widths of the multiple windows are set in accordance with at least one of:

a preset fixed value, or a temporal fixed correction according to a functional relationship or a tabular relationship;

a power-on calibration; and an adaptive adjustment.

In an embodiment, the time widths of the multiple windows are distance-dependent and are at least partially unequal.

In an embodiment, the time range outputted by the processing module is a time range corresponding to the maximum number of triggers of the operating units in the statistical information excited by the background light and/or signal light photons in the N pulses.

In a second aspect, a detection method is provided in the present disclosure. The device method is performed by the detection device as described in the first aspect. The detection method includes:

emitting, by the light source, a detection pulse to a detected object;

detecting, by the detector array, incident photons in multiple windows; and acquiring time range information based on the number of photons incident in the multiple windows that is obtained by statistics.

In an embodiment, the detection method further includes:

detecting incident photons in multiple windows within the acquired time range information; and acquiring a photon arrival time based on the incident photons in the multiple windows within the acquired time range information.

In an embodiment, a time width of each of the multiple windows is greater than a time width of each of the multiple windows related to the time range information.

In an embodiment, the photon arrival time acquired based on the incident photons in the multiple windows within the time range information is obtained based on a histogram generated by a TDC.

In an embodiment, time widths of the multiple windows are the same as each other.

In an embodiment, the time widths of the multiple windows are related to the background light.

In an embodiment, the time widths of the multiple windows are set in accordance with a probability threshold of the background light triggering the operating pixel units in the detector array.

In an embodiment, the time widths of the multiple windows are distance-dependent and are at least partially unequal.

In an embodiment, the time widths of the multiple windows are set in accordance with at least one of:

a preset fixed value, or a temporal fixed correction according to a functional relationship or a tabular relationship;

a power-on calibration; and an adaptive adjustment.

Details of one or more embodiments of the present disclosure are presented in the drawings and description below. Other features, objects and advantages of the present disclosure are apparent from the specification, the drawings, and the claims.

BRIEF DESCRIPTION OF THE DRAWINGS

In order to illustrate technical solutions of embodiments of the present disclosure more clearly, the drawings used for the embodiments are briefly introduced in the following. It should be understood that the drawings show only some embodiments of the present disclosure, and should not be regarded as a limitation of the scope. Other drawings may be obtained by those skilled in the art from these drawings without any creative work.

DETAILED DESCRIPTION OF EMBODIMENTS

Figure 1:
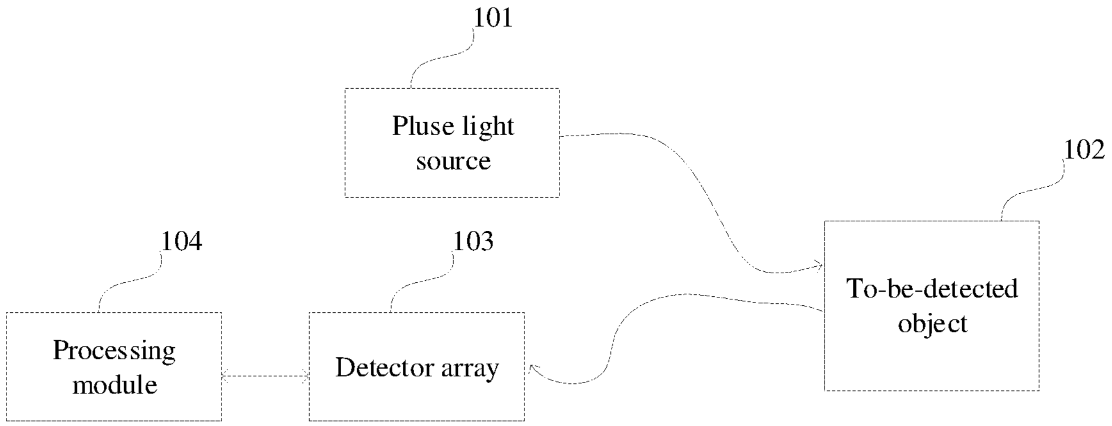
FIG. 1 is a schematic structural diagram of a detection device according to an embodiment of the present disclosure.

In order to make objects, technical solutions and advantages of the embodiments of the present disclosure clearer, the technical solutions in the embodiments of the present disclosure are clearly and completely described below with reference to the drawings in the embodiments of the present disclosure. Apparently, the described embodiments are some but not all embodiments of the present disclosure. Components of the embodiments generally described and illustrated in the drawings herein may be arranged and designed in a variety of different configurations.

Therefore, the following detailed description for the embodiments of the present disclosure provided in the drawings is not intended to limit the scope of the present disclosure as claimed, but is merely representative of selected embodiments of the present disclosure. Based on the embodiments in the present disclosure, all other embodiments obtained by those skilled in the art without creative work shall fall in the protection scope of the present disclosure.

It should be noted that, similar numerals and letters refer to similar items in the following drawings. Therefore, if an item is defined in a drawing, the item is not required to be further defined and explained in subsequent drawings.

FIG. 1 is a schematic structural diagram of a detection device according to an embodiment of the present disclosure. As shown in FIG. 1, the detection device includes a pulse light source 101, a detector array 103, and a processing module 104.

The pulse light source 101 is configured to emit a detection pulse to a to-be-detected object 102. The to-be-detected object 102 reflects part of the pulse light source to the detector array 103. The detector array 103 includes multiple pixel units, at least some of which are used as operating units configured to acquire excitation information in response to a background light and/or signal light photon incident thereon in multiple windows. The detector array 103 may be provided by a SPAD array. The detector array 103 receives the reflected photon. The reflected photon hits a high electric field region to generate a photoelectric effect and cause avalanche of the SAPD. Each pixel unit in the SPAD array detects a time of the avalanche caused by an arrival photon in a window detection period. If the avalanche caused by the photon is detected in a certain detection window period, it is considered that an event is detected, and it is marked that the event is detected in the detection window period. The marking may be implemented by, for example, accumulatively adding 1, which is not limited in the present disclosure.

Based on the statistics for the detected events marked in each detection window, the processing module 104 may determine in which detection window the reflected photon is detected. Once an arrival time range of the reflected photon is determined, the arrival time of the reflected photon may be further detected in this time range. For further detection of the arrival time of the reflected photon, a TDC module may be used. The TDC module generates a time code based on the arrival time of the reflected photon. The processing module may generate a histogram based on the time code, and finally obtain the exact arrival time of the reflected photon based on the histogram.

After obtaining the arrival time of the reflected photon, the distance to the to-be-detected object may be detected according to the arrival time of the photon. The distance D may be calculated by the following formula.

$$D = c \cdot t/2 \quad (1)$$

where c represents the light speed.

Figure 2:
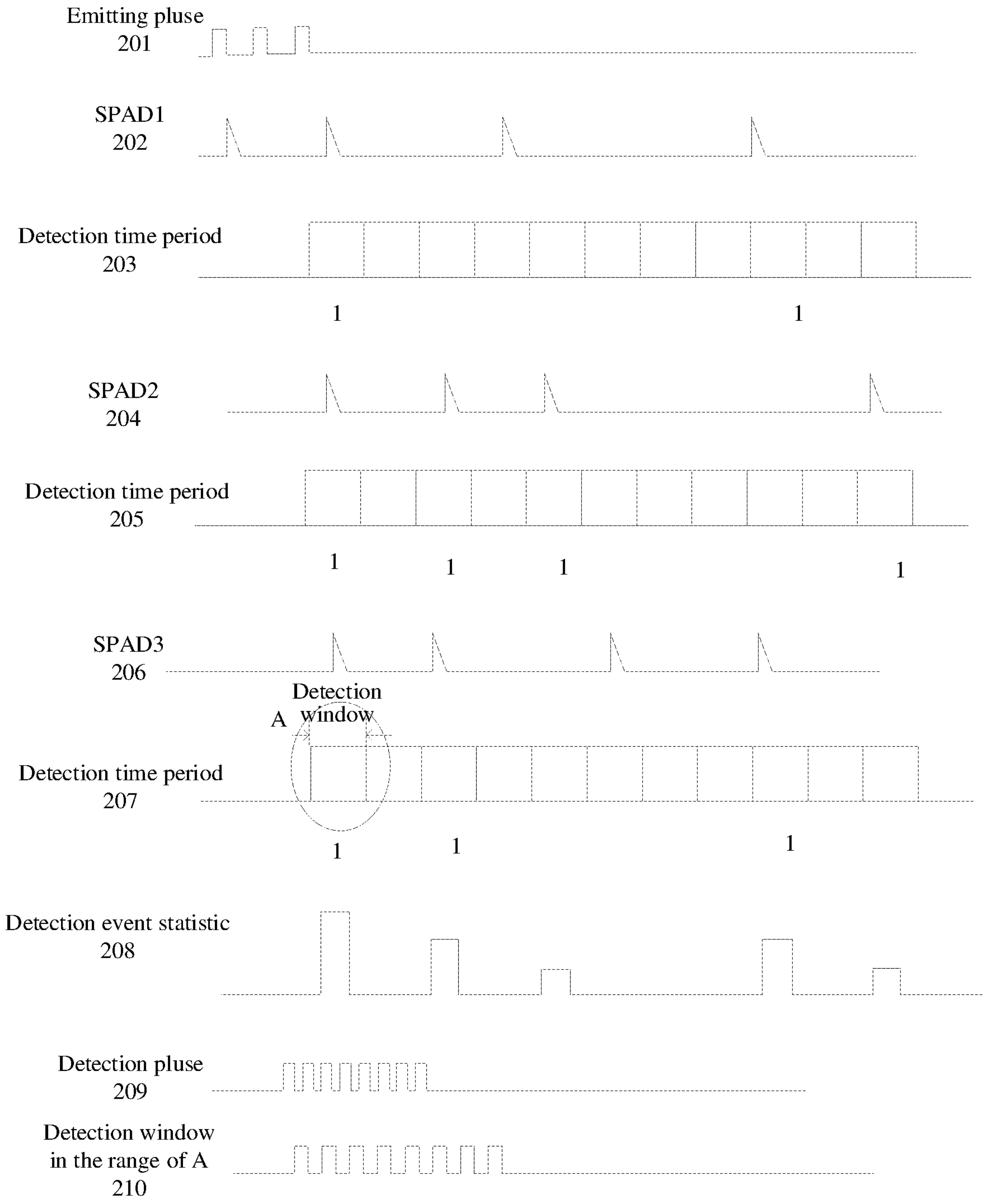
FIG. 2 is a schematic diagram showing a timing for detecting photons according to an embodiment of the present disclosure.
Figure 6:
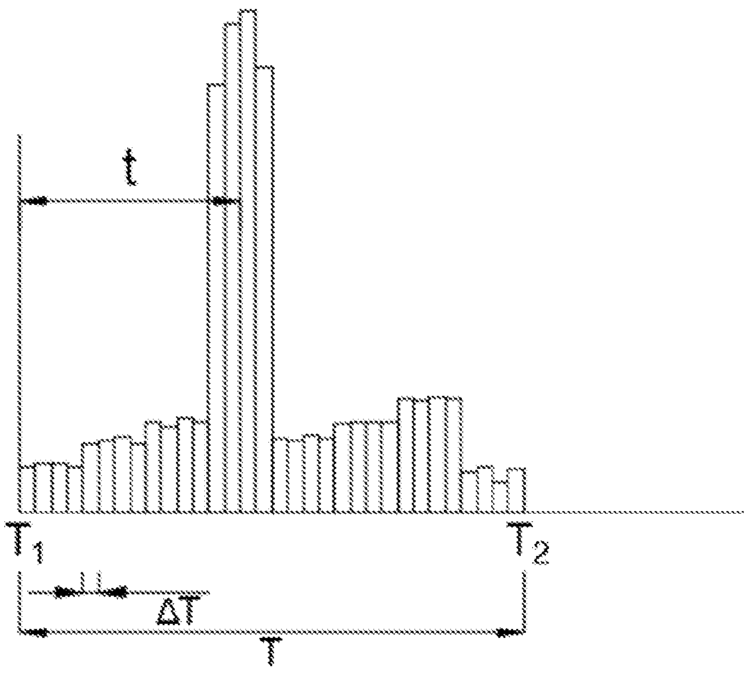
FIG. 6 is a schematic diagram showing a histogram drawn by a processing module in the detection device according to the embodiment of the present disclosure.

FIG. 2 is a schematic diagram showing a timing for detection photons according to another embodiment of the present disclosure. As shown in FIG. 2, a pulse light source emits a pulse 201. A 202 SPAD1, a 204 SPAD2 and a 206 SPAD3 in a detector array are each a SPAD unit in the detector array, to detect a photon formed by the reflection of the emitted pulse 201 by the to-be-detected object. The detection time periods respectively corresponding to the SPADs 202, 204 and 206 are denoted by reference numerals 203, 205 and 207. The detection windows respectively in the detection time periods 203, 205 and 207 have the same time width. If a SPAD avalanche event triggered by a photon is detected, the corresponding detection window is marked as 1. In this embodiment, the detected trigger event is not entirely triggered by the reflected photon. In a case that the ambient light is relatively strong, some trigger events are triggered by the ambient light. The time period of the selected detection window is required to ensure that, trigger events are at least partly triggered by the reflected photon, but not entirely triggered by the ambient light. If the trigger events are all triggered by the ambient light, the reflected photon cannot be detected. Generally, in engineering practice, the number of event triggers caused by the ambient light is required to not exceed 70% of the total number of event triggers. In the detection event statistic 208, the statistic is performed on trigger events detected in each detection window, where a detection window including the most detected events is considered to be a time period in which the reflected photon arrives. For example, if the detection window has a time period of 1 ns, it is determined which 1 ns the reflected photon arrives at the detector array. In this embodiment, the detection event statistic 208 is performed based on a single detection, and the statistic may be performed based on multiple detections in other implementations, which is not limited in the present disclosure. In this embodiment, the detection event statistic 208 is performed based on the detection results of the SPADs 202, 204 and 206 together. In other embodiments, the statistic may be performed on detection events of each of the SPADs 202, 204 and 206, and multiple time periods are respectively obtained by the statistic based on multiple detection results to improve the detection resolution, which is not limited in the present disclosure. As shown in FIG. 2, a detection window A is determined as the arrival time range of the reflected photon. In this embodiment, the detection event statistic 208 is performed based on a single detection, and the statistic may be performed based on multiple detections in other implementations, which is not limited in the present disclosure. After determining the detection window A, the pulse light source continues to emit a detection pulse 209. The detection pulse 201 and detection pulse 209 may be the same pulse, or may have different pulse widths and/or frequencies. The range A may be further divided into multiple detection windows, as shown in 210 in FIG. 2. The arrival time of the reflected photon is further detected in 210. The TDC module generates a time code based on the arrival time of the reflected photon. The processing module may generate a histogram based on the time code, and finally obtain the exact arrival time of the reflected photon based on the histogram. A plotted histogram is shown in FIG. 6, where $\Delta T$ represents the width of the detection window, T1 and T2 respectively represent a starting time instant and an ending time instant of the histogram plotting, [T1, T2] is a time interval of the histogram, and $T=T2-T1$ represents a total time width. A vertical coordinate of the time unit $\Delta T$ is the counted number of the photons received in the corresponding detection window. Based on the histogram, the position of the pulse waveform can be determined by a method such as a highest peak method, and the corresponding flight time t can be obtained.

Figure 3:
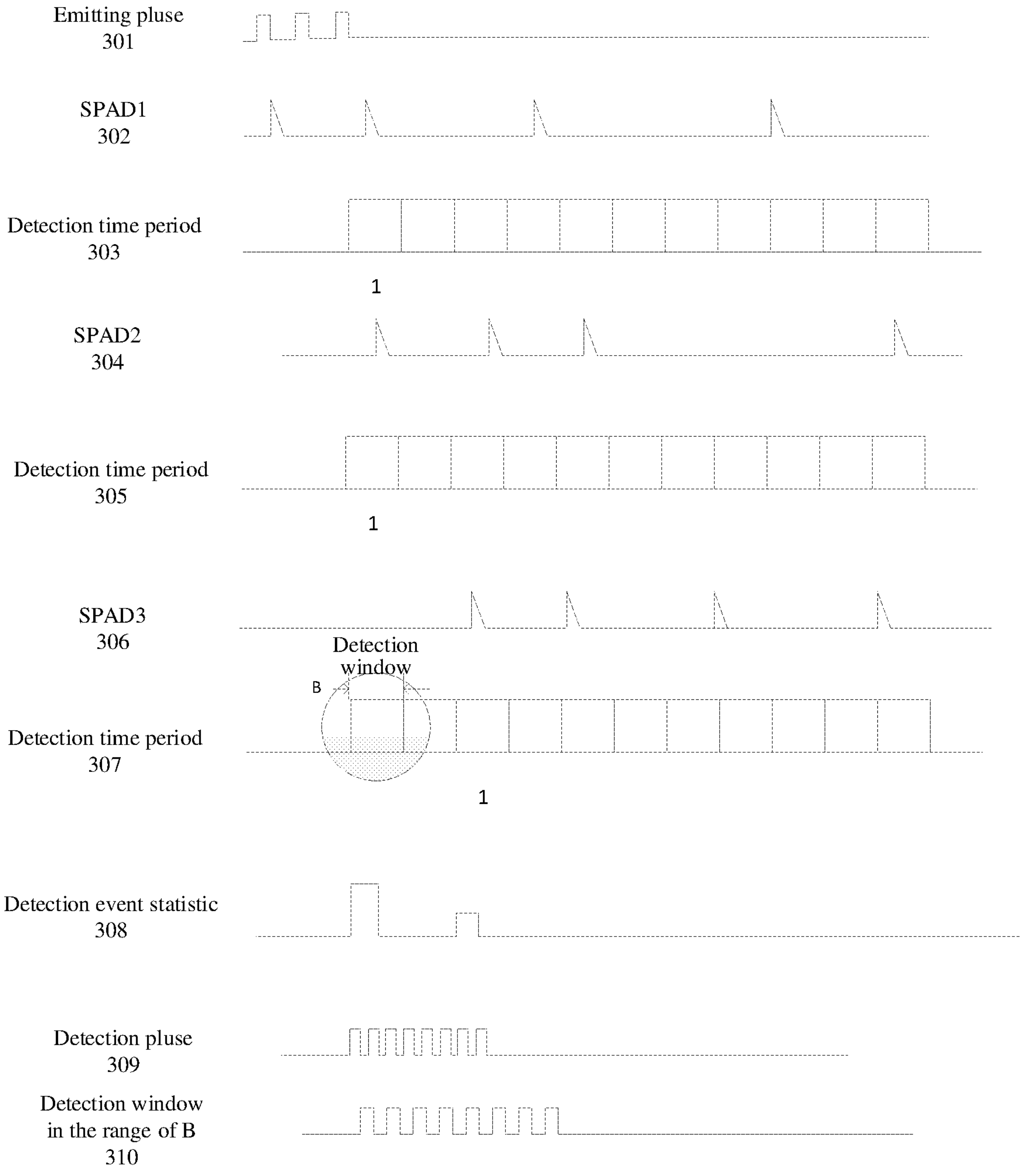
FIG. 3 is a schematic diagram showing a timing for detection photons according to another embodiment of the present disclosure.

FIG. 3 is a schematic diagram showing a timing for detection photons according to another embodiment of the present disclosure. As shown in FIG. 3, a pulse light source emits a pulse 301. A 302 SPAD1, a 304 SPAD2 and a 306 SPAD3 in a detector array are each a SPAD unit in the detector array, to detect a photon formed by the reflection of the emitted pulse 301 by the to-be-detected object. The detection time periods respectively corresponding to the SPADs 302, 304 and 306 are denoted by reference numerals 303, 305 and 307. The detection windows respectively in the detection time periods 303, 305 and 307 have the same time width. If a SPAD avalanche event triggered by a photon is detected, the corresponding detection window is marked as 1. In the case of emitting the detection pulse 301 once, if a trigger time is detected in a detection window in the detection time period, detection windows after this detection window are not marked as 1. That is, the trigger event can be detected only once in the entire detection time period.

In this embodiment, the detected trigger event is not entirely triggered by the reflected photon. In a case that the ambient light is relatively strong, some trigger events are triggered by the ambient light. The time period of the selected detection window is required to ensure that, trigger events are at least partly triggered by the reflected photon, but not entirely triggered by the ambient light. If the trigger events are all triggered by the ambient light, the reflected photon cannot be detected. Generally, in engineering practice, the number of event triggers caused by the ambient light is required to not exceed 70% of the total number of event triggers. In the detection event statistic 308, the statistic is performed on trigger events detected in each detection window, where a detection window including the most detected events is considered to be a time period in which the reflected photon arrives. For example, if the detection window has a time period of 1 ns, it is determined which 1 ns the reflected photon arrives at the detector array. In this embodiment, the detection event statistic 203 is performed based on a single detection, and the statistic may be performed based on multiple detections in other implementations, which is not limited in the present disclosure. In this embodiment, the detection event statistic 308 is performed based on the detection results of the SPADs 302, 304 and 306 together. In other embodiments, the statistic may be performed on detection events of each of the SPADs 302, 304 and 306, and multiple time periods are respectively obtained by the statistic based on multiple detection results to improve the detection resolution, which is not limited in the present disclosure. As shown in FIG. 2, a detection window B is determined as the arrival time range of the reflected photon. In this embodiment, the detection event statistic 308 is performed based on a single detection, and the statistic may be performed based on multiple detections in other implementations, which is not limited in the present disclosure. After determining the detection window B, the pulse light source continues to emit a detection pulse 309. The detection pulse 301 and detection pulse 309 may be the same pulse, or may have different pulse widths and/or frequencies. The range B may be further divided into multiple detection windows, as shown in 310 in FIG. 3. The arrival time of the reflected photon is further detected in 310. The TDC module generates a time code based on the arrival time of the reflected photon. The processing module may generate a histogram based on the time code, and finally obtain the exact arrival time of the reflected photon based on the histogram. A plotted histogram is shown in FIG. 6, where $\Delta T$ represents the width of the detection window, T1 and T2 respectively represent a starting time instant and an ending time instant of the histogram plotting, [T1, T2] is a time interval of the histogram, and $T=T2-T1$ represents a total time width. A vertical coordinate of the time unit $\Delta T$ is the counted number of the photons received in the corresponding detection window. Based on the histogram, the position of the pulse waveform can be determined by a method such as a highest peak method, and the corresponding flight time t can be obtained.

Figure 4:
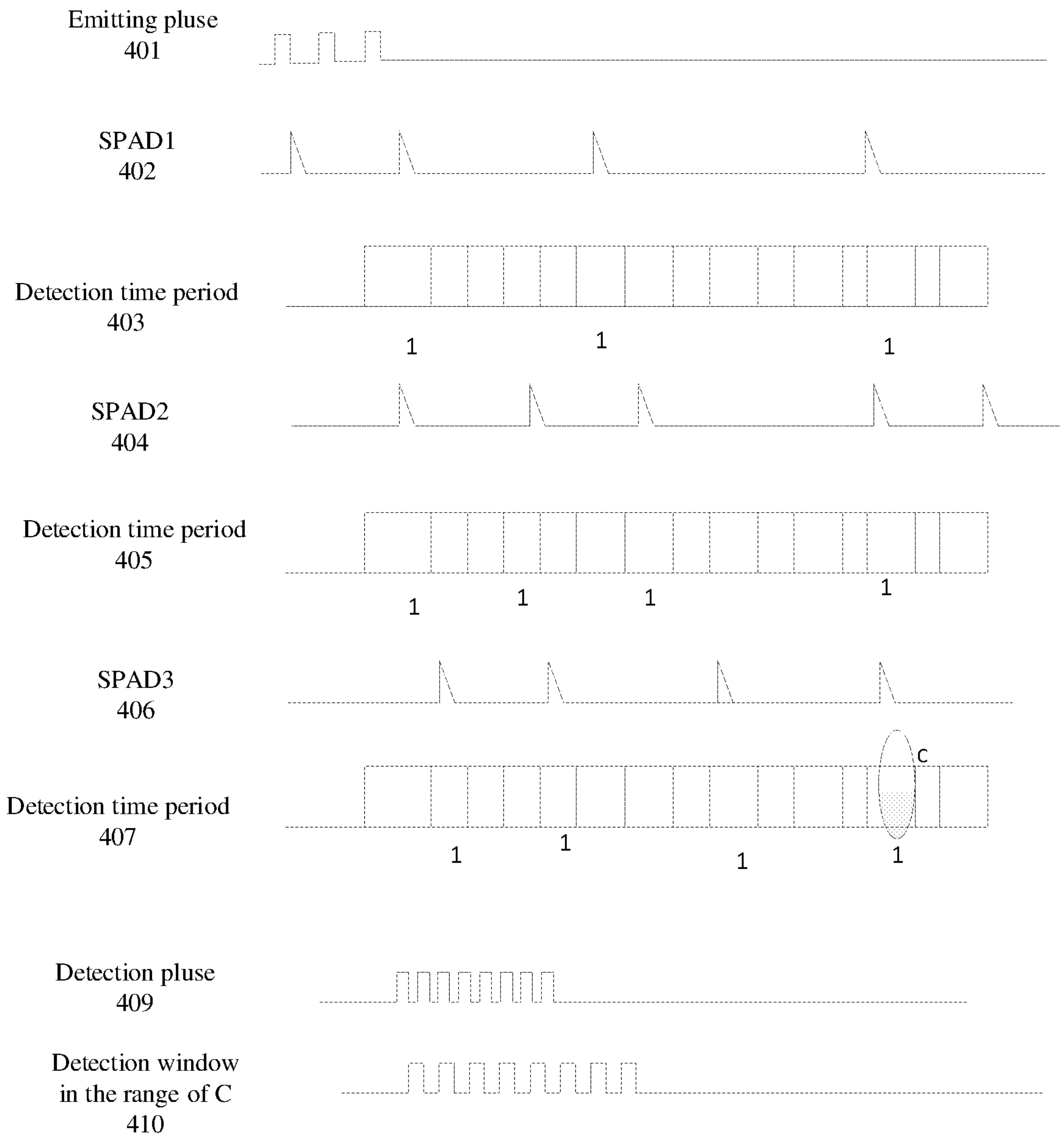
FIG. 4 is a schematic diagram showing a timing for detection photons according to another embodiment of the present disclosure.

FIG. 4 is a schematic diagram showing a timing for detection photons according to another embodiment of the present disclosure. As shown in FIG. 4, a pulse light source emits a pulse 401. A 402 SPAD1, a 404 SPAD2 and a 406 SPAD3 in a detector array are each a SPAD unit in the detector array, to detect a photon formed by the reflection of the emitted pulse 401 by the to-be-detected object. The detection time periods respectively corresponding to the SPADs 402, 404 and 406 are denoted by reference numerals 403, 405 and 407. The detection windows respectively in the detection time periods 403, 405 and 407 have different time widths. The time widths of the detection windows may be set in accordance with: a preset fixed value, or a temporal fixed correction according to a functional relationship or a tabular relationship; a power-on calibration, or an adaptive adjustment. If a SPAD avalanche event triggered by a photon is detected, the corresponding detection window is marked as 1. In this embodiment, the detected trigger event is not entirely triggered by the reflected photon. In a case that the ambient light is relatively strong, some trigger events are triggered by the ambient light. The time period of the selected detection window is required to ensure that, trigger events are at least partly triggered by the reflected photon, but not entirely triggered by the ambient light. If the trigger events are all triggered by the ambient light, the reflected photon cannot be detected. Generally, in engineering practice, the number of event triggers caused by the ambient light is required to not exceed 70% of the total number of event triggers. In this embodiment, the detection event statistic is performed based on a single detection, and the statistic may be performed based on multiple detections in other implementations, which is not limited in the present disclosure. In this embodiment, the detection event statistic is performed based on the detection results of the SPADs 402, 404 and 406 together. In other embodiments, the statistic may be performed on detection events of each of the SPADs 402, 404 and 406, and multiple time periods are respectively obtained by the statistic based on multiple detection results to improve the detection resolution, which is not limited in the present disclosure. As shown in FIG. 4, a detection window C is determined as the arrival time range of the reflected photon. After determining the detection window C, the pulse light source continues to emit a detection pulse 409. The detection pulse 401 and detection pulse 409 may be the same pulse, or may have different pulse widths and/or frequencies. The range C may be further divided into multiple detection windows, as shown in 410 in FIG. 4. The arrival time of the reflected photon is further detected in 410. The TDC module generates a time code based on the arrival time of the reflected photon. The processing module may generate a histogram based on the time code, and finally obtain the exact arrival time of the reflected photon based on the histogram. A plotted histogram is shown in FIG. 6, where $\Delta T$ represents the width of the detection window, T1 and T2 respectively represent a starting time instant and an ending time instant of the histogram plotting, [T1, T2] is a time interval of the histogram, and $T=T2-T1$ represents a total time width. A vertical coordinate of the time unit $\Delta T$ is the counted number of the photons received in the corresponding detection window. Based on the histogram, the position of the pulse waveform can be determined by a method such as a highest peak method, and the corresponding flight time t can be obtained.

Figure 5:
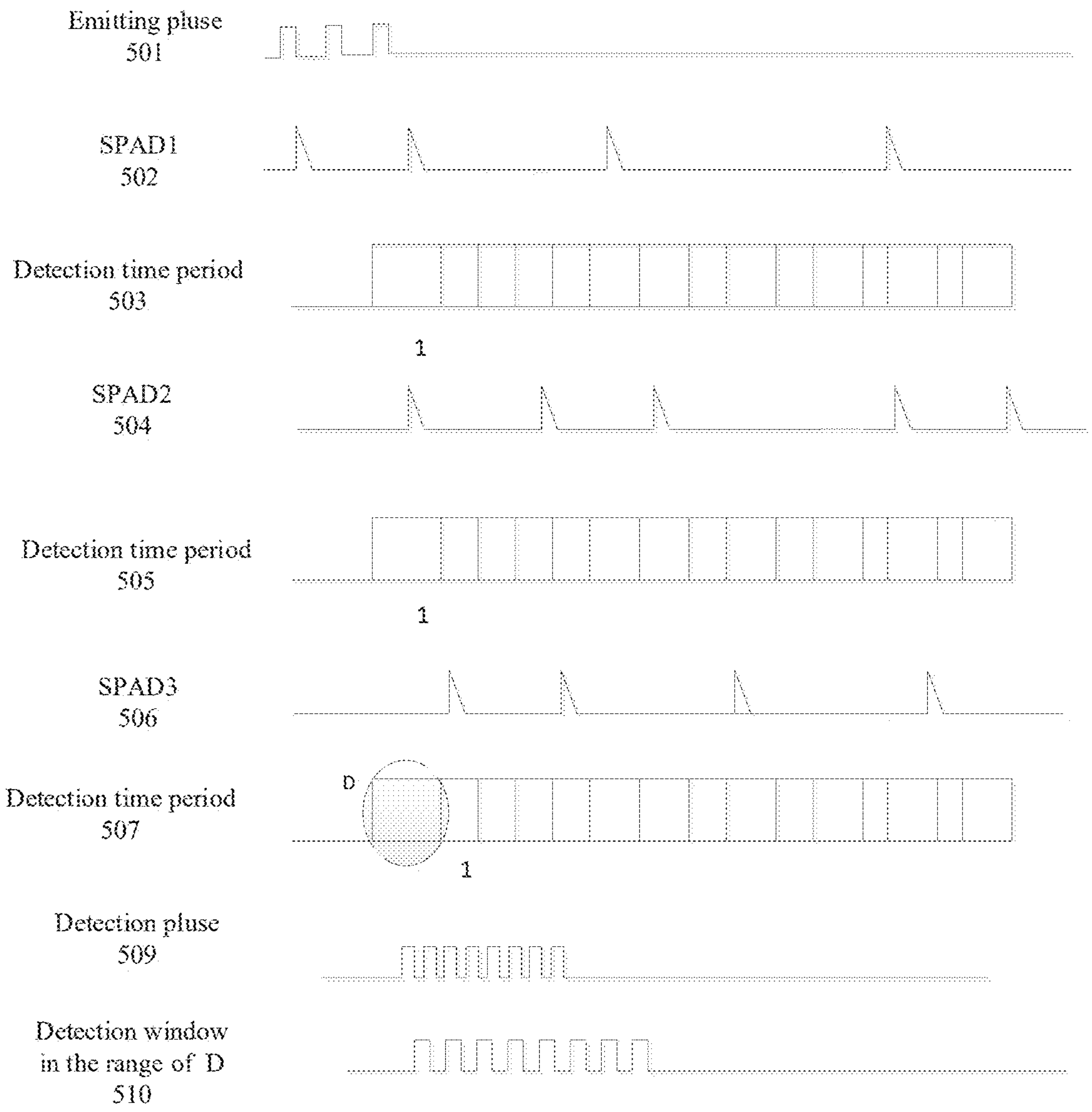
FIG. 5 is a schematic diagram showing a timing for detection photons according to another embodiment of the present disclosure.

FIG. 5 is a schematic diagram showing a timing for detecting photons according to another embodiment of the present disclosure. As shown in FIG. 5, a pulse light source emits a pulse 501. A 502 SPAD1, a 504 SPAD2 and a 506 SPAD3 in a detector array are each a SPAD unit in the detector array, to detect a photon formed by the reflection of the emitted pulse 501 by the to-be-detected object. The detection time periods respectively corresponding to the SPADs 502, 504 and 506 are denoted by reference numerals 503, 505 and 507. The detection windows respectively in the detection time periods 503, 505 and 507 have different time widths. The time widths of the detection windows may be set in accordance with: a preset fixed value, or a temporal fixed correction according to a functional relationship or a tabular relationship; a power-on calibration, or an adaptive adjustment. If a SPAD avalanche event triggered by a photon is detected, the corresponding detection window is marked as 1. In the case of emitting the detection pulse 501 once, if a trigger time is detected in a detection window in the detection time period, detection windows after this detection window are not marked as 1. That is, the trigger event can be detected only once in the entire detection time period.

In this embodiment, the detected trigger event is not entirely triggered by the reflected photon. In a case that the ambient light is relatively strong, some trigger events are triggered by the ambient light. The time period of the selected detection window is required to ensure that, trigger events are at least partly triggered by the reflected photon, but not entirely triggered by the ambient light. If the trigger events are all triggered by the ambient light, the reflected photon cannot be detected. Generally, in engineering practice, the number of event triggers caused by the ambient light is required to not exceed 70% of the total number of event triggers. In this embodiment, the detection event statistic is performed based on a single detection, and the statistic may be performed based on multiple detections in other implementations, which is not limited in the present disclosure. In this embodiment, the detection event statistic is performed based on the detection results of the SPADs 502, 504 and 506 together. In other embodiments, the statistic may be performed on detection events of each of the SPADs 502, 504 and 506, and multiple time periods are respectively obtained by the statistic based on multiple detection results to improve the detection resolution, which is not limited in the present disclosure. As shown in FIG. 5, a detection window D is determined as the arrival time range of the reflected photon. After determining the detection window D, the pulse light source continues to emit a detection pulse 509. The detection pulse 501 and detection pulse 509 may be the same pulse, or may have different pulse widths and/or frequencies. The range D may be further divided into multiple detection windows, as shown in 510 in FIG. 5. The arrival time of the reflected photon is further detected in 510. The TDC module generates a time code based on the arrival time of the reflected photon. The processing module may generate a histogram based on the time code, and finally obtain the exact arrival time of the reflected photon based on the histogram. A plotted histogram is shown in FIG. 6, where $\Delta T$ represents the width of the detection window, T1 and T2 respectively represent a starting time instant and an ending time instant of the histogram plotting, [T1, T2] is a time interval of the histogram, and $T=T2-T1$ represents a total time width. A vertical coordinate of the time unit $\Delta T$ is the counted number of the photons received in the corresponding detection window. Based on the histogram, the position of the pulse waveform can be determined by a method such as a highest peak method, and the corresponding flight time t can be obtained.

With the detection device according to the embodiment of the present disclosure, the array of optical detector elements (e.g., single photon detectors, such as SPADs) can be configured to: count the incident photons without using the TDC (i.e., without performing conversion of the arrival time of the photon to a digit), and obtain the arrival time range of the photon, which has a less computational intensity and/or power consumption than some conventional methods. In addition, the TDC is used when obtaining target detection information in the multiple windows related to the time range information, ensuring the detection accuracy.

Figure 7:
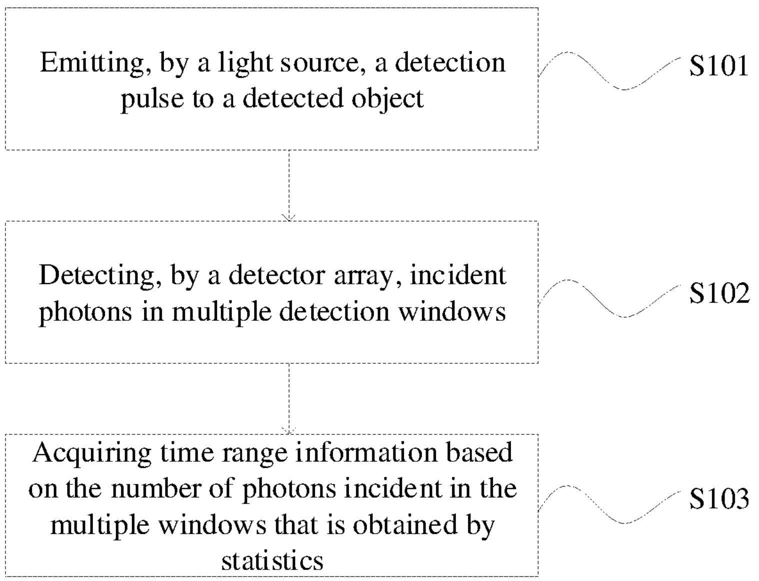
FIG. 7 is a schematic flowchart of a detection method according to an embodiment of the present disclosure.

FIG. 7 is a schematic flowchart of a detection method according to an embodiment of the present disclosure. The method may be performed by the detection device as described above. The basic principle and the technical effect of the method are the same as the corresponding device embodiment. For the part not mentioned in this embodiment, the corresponding content of the device embodiment may be referred to for the purpose of the brief description. As shown in FIG. 7, the detection method includes the following steps S101 to S103.

In S101, a light source emits a detection pulse to a detected object.

In S102, a detector array detects incident photons in multiple windows.

In S103, time range information is acquired based on the number of photons incident in the multiple windows that is obtained by statistics.

Figure 8:
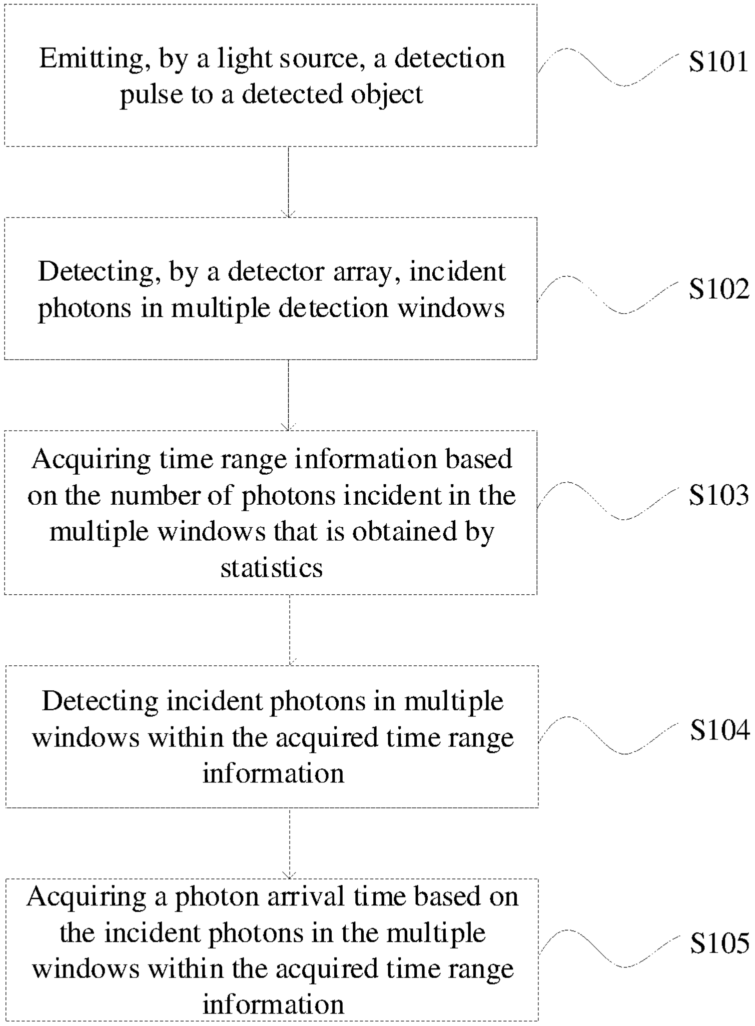
FIG. 8 is a schematic flowchart of a detection method according to another embodiment of the present disclosure.

Based on the above embodiment, the detection method may further include the following steps S104 and S105, as shown in FIG. 8.

In S104, incident photons are detected in multiple windows within the acquired time range information.

In S105, a photon arrival time is acquired based on the incident photons in the multiple windows within the acquired time range information.

In an embodiment, a time width of each of the multiple windows is greater than a time width of each of the multiple windows related to the time range information.

In an embodiment, the photon arrival time acquired based on the incident photons in the multiple windows within the time range information is obtained based on a histogram generated by a TDC.

In an embodiment, time widths of the multiple detection windows are the same as each other. Time widths of the multiple detection windows are the same as each other.

In an embodiment, the time widths of the detection windows are related to the background light.

In an embodiment, the time widths of the multiple windows are set in accordance with a probability threshold of the background light triggering the operating pixel units in the detector array.

In an embodiment, the time widths of the multiple windows are distance-dependent and are at least partially unequal.

In an embodiment, the time widths of the multiple windows are set in accordance with at least one of:

a preset fixed value, or a temporal fixed correction according to a functional relationship or a tabular relationship; a power-on calibration; and an adaptive adjustment.

The implementation principle and the technical effect of the detection method are similar to those of the detection device provided in the previous embodiments, which are not repeated herein.

It should be noted that, relational terms such as “first” and “second” herein are only used to distinguish one entity or operation from another entity or operation, and do not necessarily require or imply there is such actual relationship or sequence between these entities or operations. Moreover, terms “comprising”, “including” or any other variations thereof are intended to encompass a non-exclusive inclusion, such that a process, a method, an article or a device including a series of elements includes not only those elements, but also includes other elements that are not explicitly listed or inherent to such the process, method, article or device. Without further limitation, an element defined by a phrase "including a . . . " does not preclude the presence of additional identical elements in a process, method, article or device including the element.

It should further be noted that the terms such as "module", "unit" and "component" as used in the present disclosure are intended to denote a computer-related entity, which may be implemented by hardware, software, a combination of hardware and software, or software in execution. For example, the component may be but is not limited to, a process running on a processor, a processor, an object, an executable code, an executed thread, a program, and/or a computer. As an illustration, both the application running on the server and the server may be components. One or more components may reside in a process and or an executed thread, and the components may be located within a computer and/or distributed between two or more computers.

Preferred embodiments of the present disclosure are given in the above description, and are not intended to limit the present disclosure. For those skilled in the art, the present disclosure may have various modifications and changes. Any modifications, equivalents and improvements made in the spirit and principle of the present disclosure should be included in the protection scope of the present disclosure. It should be noted that similar numerals and letters refer to similar items in the following drawings. Therefore, if an item is defined in a drawing, the item is not required to be further defined and explained in subsequent drawings. Preferred embodiments of the present disclosure are given in the above description, and are not intended to limit the present disclosure. For those skilled in the art, the present disclosure may have various modifications and changes. Any modifications, equivalents and improvements made in the spirit and principle of the present disclosure should be included in the protection scope of the present disclosure.

The invention claimed is:

1. A detection device, comprising:

a pulse light source configured to emit a pulse light signal;

a detector array comprising a plurality of pixel units, wherein at least some of the pixel units are used as operating units configured to acquire excitation information in response to background light and/or signal light photons incident thereon in a plurality of windows; and a processing module configured to acquire time range information based on the excitation information of the operating units, wherein time widths of the plurality of windows are set in accordance with a probability threshold of the background light triggering the operating pixel units in the detector array.

2. The detection device according to claim 1, wherein the operating units being the at least some of the pixel units in the detector array are further configured to acquire the excitation information in response to the background light and/or the signal light photons incident thereon in the plurality of windows related to the time range information acquired by the processing module; and the processing module is further configured to acquire final target detection information based on the excitation information in the plurality of windows related to the time range information.

3. The detection device according to claim 2, further comprising:

a time digital converter (TDC) module configured to output a time code of the excitation information in the plurality of windows related to the time range information to the processing module.

4. The detection device according to claim 3, wherein the processing module is further configured to construct a histogram based on the time code.

5. The detection device according to claim 4, wherein a flight time of the pulse light beam is determined based on the time range information and/or the histogram.

6. The detection device according to claim 2, wherein a time width of each of the plurality of windows is greater than a time width of each of the plurality of windows related to the time range information.

7. The detection device according to claim 1, wherein the pulse light source is configured to emit N pulses, and the operating pixel units in the detector array are configured to acquire statistical information excited by background light and/or signal light photons in the N pulses.

8. The detection device according to claim 7, wherein the time range outputted by the processing module is a time range corresponding to the maximum number of triggers of the operating units in the statistical information excited by the background light and/or the signal light photons in the N pulses.

9. The detection device according to claim 1, wherein the detector array is provided by a single photon avalanche diode (SPAD) array.

10. The detection device according to claim 1, wherein time widths of the plurality of windows are the same as each other.

11. The detection device according to claim 1, wherein time widths of the plurality of windows are related to the background light.

12. The detection device according to claim 1, wherein the time widths of the plurality of windows are distance-dependent and are at least partially unequal.

13. A detection method, performed by the detection device according to claim 1, the method comprising:

emitting, by the light source, a detection pulse to a detected object;

detecting, by the detector array, incident photons in a plurality of windows; and acquiring the time range information based on number of photons incident in the plurality of windows that is obtained by statistics, wherein time widths of the plurality of windows are set in accordance with a probability threshold of the background light triggering the operating pixel units in the detector array.

14. The detection method according to claim 13, further comprising:

detecting the incident photons in a plurality of windows within the acquired time range information; and acquiring a photon arrival time based on the incident photons in the plurality of windows within the acquired time range information.

15. The detection method according to claim 14, wherein the photon arrival time acquired based on the incident photons in the plurality of windows within the time range information is obtained based on a histogram generated by a time digital converter (TDC).

16. The detection method according to claim 14, wherein a time width of each of the plurality of windows is greater than a time width of each of the plurality of windows related to the time range information.

17. The detection method according to claim 13, wherein time widths of the plurality of windows are the same as each other.

18. The detection method according to claim 13, wherein the time widths of the plurality of windows are related to the background light.

* * * * *